US008705707B1

(12) United States Patent
Schilit et al.

(10) Patent No.: US 8,705,707 B1
(45) Date of Patent: Apr. 22, 2014

(54) LABELING COMMUNCATION DEVICE CALL LOGS

(75) Inventors: William Noah Schilit, Mountain View, CA (US); Roy Want, Los Altos, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/619,979

(22) Filed: Sep. 14, 2012

(51) Int. Cl.
*H04M 1/64* (2006.01)
(52) U.S. Cl.
USPC .................................. 379/88.11; 379/201.07
(58) Field of Classification Search
USPC ................ 379/88.11, 210.01, 266.08, 201.07
See application file for complete search history.

(56) References Cited

U.S. PATENT DOCUMENTS

| | | | |
|---|---|---|---|
| 5,241,586 A | 8/1993 | Wilson et al. | |
| 7,272,637 B1* | 9/2007 | Himmelstein | 709/217 |
| 7,441,027 B2* | 10/2008 | Malik | 709/224 |
| 2004/0141599 A1* | 7/2004 | Tang et al. | 379/93.24 |
| 2009/0119100 A1* | 5/2009 | Akella et al. | 704/235 |
| 2010/0035669 A1* | 2/2010 | Jang et al. | 455/575.4 |

OTHER PUBLICATIONS

"Handster, any app for your phone," retrieved from http://www.handster.com/annotated_call_log.html, accessed on Mar. 30, 2012, 1 p.
NickyCho, "Log Call Location," retrieved from https://market.android.com/details?id=tw.nicky.LogCallLocation&feature=search_result#?t=W251bGwsMSwxLDEsInR3Lm5pY2t5LkxvZ0Nhb GxMb2NhdGlvbiJd, accessed on Mar. 30, 2012, 2 pp.
Kulkarni, "Annotated Call Log," retrieved from https://market.android.com/details?id=ram.kulkarni.calllog, accessed on Mar. 30, 2012, 2 pp.

* cited by examiner

*Primary Examiner* — Amal Zentai
(74) *Attorney, Agent, or Firm* — Shumaker & Sieffert, P.A.

(57) ABSTRACT

A method comprising determining that a phone call has been answered, missed, or terminated, generating an indication of the phone call being answered, missed, or terminated at a graphical user interface, and determining one or more contextual identifiers associated with the phone call. The contextual identifiers may include metadata associated with the phone call, and may be based on data associated with at least one of data generated indications and data received by the computing device from a first input at the graphical user interface associated with the computing device. The method further includes storing the contextual identifiers in association with the indication of the phone call in a data structure that includes other contextual identifiers associated with other indications of phone calls. The contextual identifiers and the other contextual identifiers included in the data structure are searchable.

23 Claims, 7 Drawing Sheets

LABELING COMMUNCATION DEVICE CALL LOGS

BACKGROUND

Communication devices, such as cellular phones and personal digital assistants, have made it possible to keep track of phone calls. As the use of mobile communications devices becomes more popular, mobile communication devices are relied on as a primary means of communication. The volume of communications received or sent by a communication device can be considerable and are often difficult to manage due to the large volumes. In addition to the increase in use of and reliance on communication devices, the improved mobility of communication devices allows mobile devices to receive calls when a user is often busy doing something else. A call may be answered, terminated, or missed. In addition to this status, calls are identified with a date and time when the call was logged.

SUMMARY

In one example, this disclosure is directed to a method performed by at least one processor of a communication device, including determining, by the communication device, that a call has been answered, missed, or terminated by the communication device. The method may also include generating, at a graphical user interface associated with the communication device, an indication of the call being answered, missed, or terminated. The method may also include determining, by the communication device, one or more contextual identifiers associated with the call. The one or more contextual identifiers include metadata associated with the call approximately at a time when the indication was generated. The one or more contextual identifiers are based on data associated with at least one of generated by the communication device and data received by the communication device from a first input at the graphical user interface associated with the communication device. The method may further include storing the one or more contextual identifiers in association with the indication of the call in at least one data structure that includes other contextual identifiers associated with other indications of other calls, wherein the one or more contextual identifiers and the other contextual identifiers included in the at least one data structure are searchable, and determining one or more contextual identifiers that satisfy a search query based at least in part on a second input received at the graphical user interface, wherein the one or more contextual identifiers and the indication of the call are determined in response to the search query.

In another example, the disclosure is directed to a computer-readable storage medium encoded with instructions that, when executed, cause one or more processors of a communication device to perform operations, including determining, by a first communication device, that a call has been answered, missed, or terminated by the communication device. The operations may further include generating, at a graphical user interface associated with the communication device, an indication of the call being answered, missed or terminated. The computer-readable storage medium may include determining, by the communication device, one or more contextual identifiers associated with the call, wherein the contextual identifiers include metadata associated with the call. The contextual identifiers may be based on data associated with at least one of generated by the communication device and data received by the communication device from a first user input at the graphical user interface associated with the communication device. The computer-readable storage medium may also include storing the one or more contextual identifiers in association with the indication of the call in a data structure that includes other contextual identifiers associated with other indications of calls, wherein the one or more contextual identifiers and the other contextual identifiers included in the data structure are searchable. When the one or more contextual identifiers satisfy a search query based at least in part on a second user input received at the graphical user interface associated with the communication device, the one or more contextual identifiers and the indication of the call are determined in response to the search query.

In another example, the disclosure is directed to a communication device may include one or more processors. The communication device may also include at least one or more modules operable by the one or more processors to determine a call has been answered, missed, or terminated by the communication device. The at least one or more modules may generate, at a graphical user interface associated with the communication device, an indication of the call being answered, missed or terminated. The at least one or more modules may further be operable by the one or more processors to determine one or more contextual identifiers associated with the call, wherein the contextual identifiers include metadata associated with the call approximately at a time when the indication was generated, and wherein the contextual identifiers are based on data associated with at least one of generated by the communication device and data received by the communication device from a first user input at the graphical user interface associated with the communication device. The at least one or more modules may further be operable by the one or more processors to store the one or more contextual identifiers in association with the indication of the call in at least one data structure that includes other contextual identifiers associated with other indications of calls, wherein the one or more contextual identifiers and the other contextual identifiers included in the at least one data structure are searchable, and wherein when the one or more contextual identifiers satisfy a search query based at least in part on a second user input received at the graphical user interface associated with the communication device, the one or more contextual identifiers and the indication of the call are determined in response to the search query.

The details of one or more embodiments of the disclosure are set forth in the accompanying drawings and the description below. Other features, objects, and advantages of the disclosure will be apparent from the description and drawings, and from the claims.

DETAILED DESCRIPTION

Figure 1:
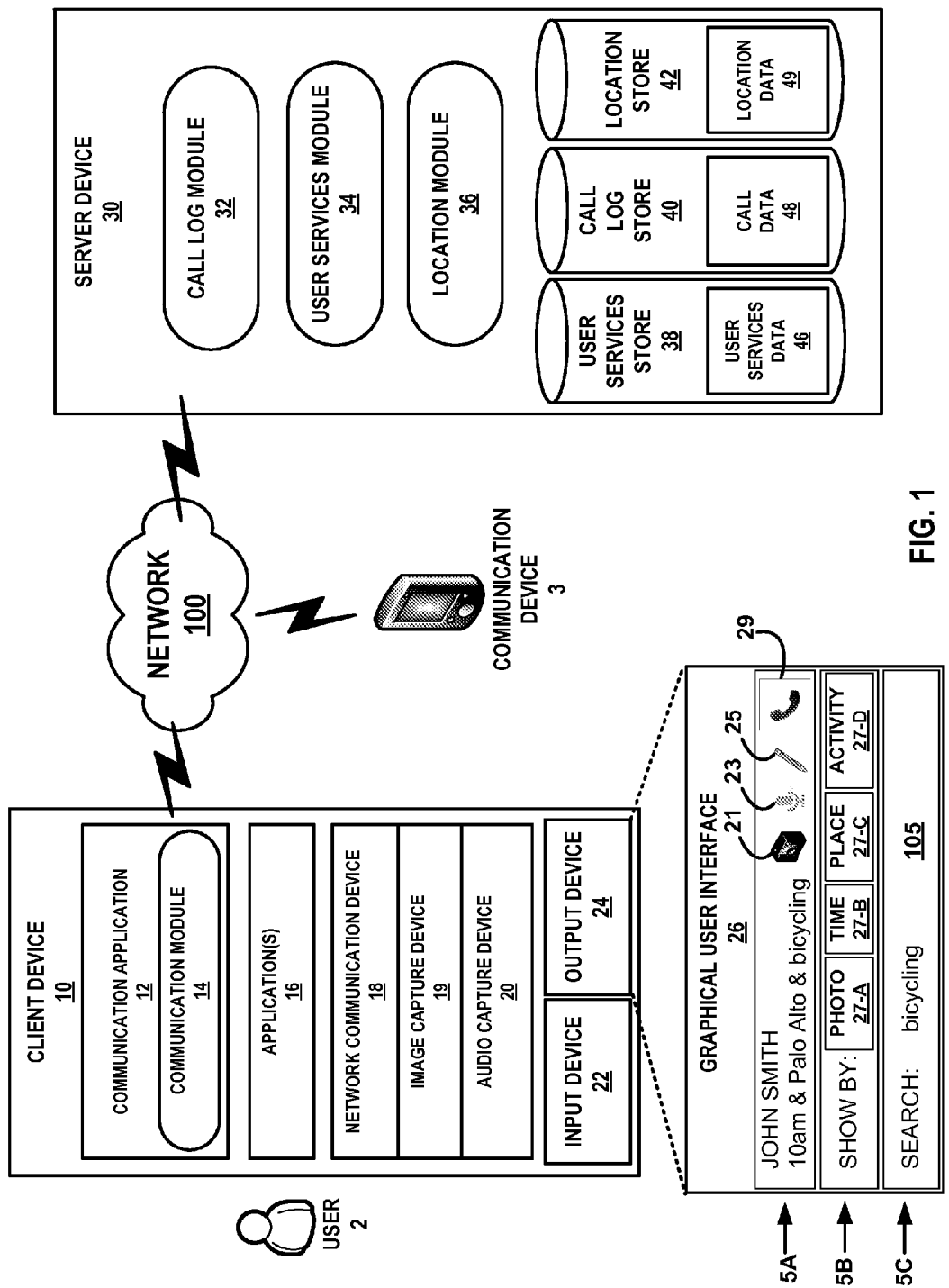
FIG. 1 is a conceptual diagram illustrating an example of a communication device, such as a client device, coupled to a server device that includes a computer implemented caller identification service, in accordance with one or more aspects of the present disclosure.

In general, this disclosure is directed to techniques that may enable a communication device (such as a smart phone or another communication device with call capabilities) to automatically and/or manually tag entries in a call log. The mobile device industry has improved the capabilities of communication devices. The present disclosure improves organization of call identification information in an easy to use and retrievable format, so that a user may identify a call after a call was answered, missed, or terminated.

A call may be any communication, such as a phone call, Short Message Service (SMS) (e.g., text message), email, or any data transfer. Throughout this disclosure, an example of a phone call is used as a non-limiting example of a communication for illustrative purposes. For example, a user of the communication device may not be able to identify a caller solely from viewing the associated phone number, but may be able to identify the caller by remembering what events and activities happened when the call occurred. An occurrence of the call may be any incoming (i.e., received) or outgoing (i.e., sent) communication. Throughout this disclosure, a call being "answered, missed, or terminated" is used as a non-limiting example for illustrative purposes of a type of phone call communication, such as received but not answered, attempted, transferred to voicemail, etc. A contextual identifier may be generated when a call is "answered, missed, or terminated." For example, a contextual identifier may be generated when a text message is received or sent by the communication device.

A contextual identifier may be generated before, during, or event after a call has occurred. Some information used in a contextual identifier may be provided by a device in a communication device network. A communication device network may have information about the caller, such as the name of the person or business being contacted or trying to contact. A graphical user interface of the communication device may also include this information in call history list format. The compiled caller identification may be displayed to the user at a graphical user interface in a call log, which allows the user to scroll through the list and may allow the user to select an entry for additional information, such as the specific telephone number identified along with the name of the caller or business at the specific date and time.

In the present disclosure, the communication device may add tags to each entry in a call log to expand the information related to each call in the call log based on information available to the communication device regarding the call. The communication device may be, for example, a server or a client device. The tags associated with the call log entry may help identify the activities and environment of the communication device around the time when the communication device logged the call. Tags associated with each call log entry may be searchable such that a user may find a particular call by searching the tag information, allowing a particular call entry to be located by identifying the contextual tag information.

Techniques of this disclosure label entries in call logs with contextual identifiers that may be searchable. Techniques may also include determining when the communication device logs the call and prompting the user to create contextual identifiers that may appear in the call log entry to help the user identify the call. If the user does create a contextual identifier to add to the call log, the user may input data about the user's activity when the call log entry was created or other information that the user associates with the call or call log entry. Additionally, a server may generate call log identifiers too and associate the generated identifiers with the call log entry. Allowing the user to create call identifiers and providing the user with the server generated identifiers allows the user an improved ability to remember the context of the call and more control of their call history.

For example, after logging a call at a mobile communication device, the mobile communication device may request data from a server implementing techniques of the present disclosure. The server may apply location techniques to identify the location of the mobile communication device at a time the call is logged. In some examples, the server may identify the location of the mobile device at a particular business or address. In other examples, location techniques may identify the location of other mobile communication devices, associated with the user's social networking post or identified in the user's contacts, in proximity to the user at the time the call is logged. The server may also apply data collection techniques to user services to identify activities of the user on the mobile communication device at the time the call is logged. The server may create a list of tags that identify the user's activities and location at the time of the call. The server may also create tags from user services associated with applications the user is interacting with on the mobile communication device. For example, user services may include calendar data, contacts, social groups, weather data, etc. The server may store data associated with the user services and create tags based on the stored data.

Once the server generates the tags based on user services data and location data, the server may send the tags to the mobile communication device. For example, user services may indicate a calendar event scheduled, applications executed, identified contacts, or addresses from the user's stored network contacts when the call was answered, terminated, or missed. At the time of logging the call, location data may identify the geolocation of the mobile communication device or it may identify businesses or addresses associated with the identified location of the mobile communication device. Another example of location data may include other users associated with the user's networking post that are near in proximity to the user when the communication device logs the call. The communication device may display the generated tags based on user services data and location data. The tags may be navigable (e.g., searchable) by user input through a GUI.

The server device and the mobile computing device may generate the contextual identifiers and the tags when the mobile communication device logs the call. For example, when the mobile computing device receives the call, the mobile computing device may determine that the user is running and may begin capturing video. Capturing data associated with the call entry, such as audio data, may begin upon receiving, placing, or terminating a call. For example, when a call is received, the computing device initiates recording audio and video with on-board input devices including a microphone and a camera, respectively.

The searchable tags, which include the indications of the call being answered, missed, or terminated, entered at the client device (such audio, images, video, and texts) are also known as contextual identifiers. Contextual identifiers may identify what the user was engaged in approximately around the time of the call. A user can browse or search the call log contextual identifiers associated with one or more calls. For instance, the user may retrieve all call log contextual identifiers associated with one or more call entries by typing terms associated with the contextual identifiers at GUI or by scrolling through lists of contextual identifiers displayed at GUI, such as photos. The user may customize the data displayed by the communication device in the call log to display certain contextual identifiers at GUI, or the communication device may select contextual identifiers based on availability of data or using matching and confidence scoring techniques.

A user may be carrying a communication device, such as a smartphone. The smartphone may send information associated with itself to a remote server implementing techniques of this disclosure. For instance, the information associated with the smartphone may include a device identifier, location information, time information, and various applications executed by the smartphone. The remote server may, based at least in part on the geolocation information, activity of application use, or associated time information, determine if other smartphones are located within a predetermined distance to the smartphone for a period of time exceeding a threshold time. In some examples, the server may determine that the user is associated with an event (e.g., a meeting, conference, party, etc.).

In other examples, the user may take photos, record audio, record video, or input text that the communication device associates with a call entry that can be used later to help identify the call within the call log. When the user takes a photo, the communication device may allow the user to enter a tag to label the photo. The communication device may save this tag in the data structure and use this stored tag as a searchable contextual identifier. For example, the user may take a photo while out shopping, around the time the user receives a call. The user may be prompted to enter a text to label the photo and may enter "Home Improvement Store" to identify the location at the approximate time of the call. This label is then saved as a contextual identifier. Additionally, when the user records an audio recording, the communication device may use voice recognition techniques to translate recognized audio into text. The text may be included in a tag that may be saved as a contextual identifier in a call log. For example, the user may receive a call from "The Phone Company." The user may record an audio file of the user stating, "Phone Company," which the communication device translates. The communication device may store the text "phone company" as a contextual identifier associated with that call in the call log.

The call log is a data structure that lists the contextual identifiers, including tags, metadata, user services data, location data, and any user input data such as photos, video, audio, and text. The server or the communication device (such as a smartphone) may compile the data and generate the data structure with the contextual identifiers. The server stores the data structure in a searchable format and adds each entry, with associated contextual identifiers, at a time that is approximately when the call is answered, missed, or terminated. All of the contextual identifiers may be added after the call was missed, for example, when the user takes a photo that is associated with the call as a contextual identifier.

In response, the server may retrieve information about a user associated with the mobile communication device, and may automatically generate a call log including at least a portion of the retrieved information about the user. For instance, the call log may include information associated with an event, such as pictures, maps, an event name, the time and location of the event, and the like. Additionally, activities that the user was engaged in on the smartphone around the time of the call, such as playing games or checking email, may be tagged as a contextual identifier. The contextual identifier is associated with the call and listed with the related call entry in the call log. In addition, activities that the user was physically participating in at the time of the call, such as at an event that the server may identify, may be tagged as a contextual identifier and associated with the call entry. In certain examples, the server may perform actions such as searching for other users in proximity to the mobile communication device or posting information included in the call log in a social network associated with one or more of the users. The server then stores the retrieved contextual identifiers and sends the retrieved contextual identifiers back to the mobile communication device to be displayed at the GUI in the call log.

The call log may be navigable (e.g., searchable) by a user. For instance, a user may retrieve all call log contextual identifiers associated with each call entry by typing in terms associated with the contextual identifiers or by scrolling through lists of contextual identifiers, such as photos. The user has the ability to set up the call log to display at the GUI certain contextual identifiers as preferred by the user, or the smartphone may select contextual identifiers for the user based on confidence information. Alternatively, the user also has the ability to isolate certain types of contextual identifiers as a different technique for searching. For example, the user may wish to search for a photo associated with a call entry. In response to the user's command, the GUI may display only the photos in the call log. The user may then scroll through the list of photos and select a photo to display as additional call log data associated with the call entry.

FIG. 1 is a conceptual diagram illustrating an example of a communication device, such as a client device 10, coupled to a server device 30 that includes a computer implemented caller identification service, in accordance with one or more aspect of the present disclosure. In some examples, client device 10 may communicate with a service provider for communication services, such as phone calls, texting, and Internet via a communications network, such as a network 100. Network 100 may support other devices, different from client device 2 such as a communication device 3, allowing communication with client device 10. As shown in FIG. 1, client device 10 may be associated with a user 2. Client device 10 may include a communication application 12, a communication module 14, one or more applications 16 (for illustration purposes, hereinafter "applications 16"), a network communication device 18, an image capture device 19, an audio capture device 20, an input device 22, and an output device 24.

In one example, user 2 may provide a user input to communication application 12, such as making a phone call using client device 10. Communication application 12 stores the call information at client device 10 using communication module 14. Communication module 14 may associate the phone call with a contextual identifier. For example, the contextual identifier may include basic descriptive information such as a name of a person or a business that the service provider may associate with the recipient of the call. Communication module 14 may associate other contextual identifiers with the phone call, such as the date and time when client device 10 makes the phone call. Communication module 14 may also associate the call made by client device 10 with other contextual identifiers, such as identifying the call as "outgoing" or "terminated," indicating that the call originated from client device 10. In other examples, client device 10 may receive incoming phone calls.

Client device 10, in some examples, contains applications 16, which includes one or more applications executable by client device 10, such as communication applications that may perform calling, texting, video, photography, or instant messaging (illustrated collectively as applications 16) and execute communication services locally at client device 10. For example, network communication device 18 may include call capabilities. Call capabilities may allow network communication device 18 to place, forward, or terminate a call, for example. Applications 16 stores the metadata related to the call, such as name, number, date and time that the call using communication module 14. Communication module 14 may create and store an indication that indicates that the call was answered, missed, or terminated. Additionally, communication module 14 may associate the call with contextual identifiers such as metadata that identifies the caller, number date, and time of the call, the indication of the call being answered, missed, or terminated, and defined tags, or any other data that is descriptive of the call.

The service provider or server device 30 may send the contextual identifiers to communication application 12 of client device 10. Communication module 12 stores the call information at client device 10 using communication module 14. Client device 10 may also receive calls sent from other devices, different from client device 10, such as from communication device 3. Another user may use communication device 3 in the network or another communication device. As described for making or sending calls, communication module 14 associates the phone call with the contextual identifier, such as identifying the call as "accepted," "incoming," "missed," or "answered." Server device 30 may additionally or alternatively store the call information, including all contextual identifiers. The basic descriptive information is then displayed at a graphical user interface (GUI) 26. GUI 26 may display the call information for each respective sent and received call, such as name, number, date, time in a specific layout. For illustrative purposes, GUI 26 displays the call information as illustrated in a call entry 5A, a filter row 5B, and a search row 5C.

In another example, after client device 10 receives or makes a call, GUI 26 may prompt user 2 to enter additional input information when the call was sent or received by entering user input to an application. Client device 10 has one or more applications 16, and for illustration purposes, is referred to herein as "applications 16," that allows user 2 to enter additional input information for identifying the call entry. For example, after a call is sent or received, user 2 may provide a user input, such as using an image capture application causing image capture device 19 to take an image, such as a still photograph or video. The image capture application stores the image at client device 10 using communication module 14 (or a module from applications 16).

In another example, after a call is sent or received, GUI 26 may prompt user 2 to provide audio input, such as using an audio capture application causing audio capture device 20 to record a voice memo or sound. After being prompted by GUI 26, user 2 may also enter a memo using applications 16, for example, typing in text "telemarketer" or "on airplane" at input device 22. User 2 may use more than one application of applications 16, such as user 2 capturing an image with the camera application and entering text at input device 22 for describing the image or the circumstances when the call was answered, missed, or terminated. Communication module 14 may receive any text, images, or audio as additional input information that user 2 inputs and communication module 14 may associate the text, image or audio with the call. Client device 10 may later send the contextual identifiers (e.g., name, number, date, etc.) and additional input information (e.g., image, video, audio, text) to a remote device, such as server device 30 using communication module 14. Server device 30 may store the contextual identifiers and the additional input information image at call log module 32. When the image is stored at client device 10, communication module 14 may associate the contextual identifiers with the additional input information. When the image is saved at server device 30, call log module 32 may associate the additional input information with the contextual identifiers.

Client device 10 includes devices, such as image capture device 19, audio capture device 20, and network communication device 18, that are integrated with applications 16, which when executed, perform data collection techniques, such as collecting audio, video, and photo data, locally at client device 10. Data may also be collected by client device 10 by applications 16, such as executing a graphical keyboard application that allows the user to enter descriptive text, for example at GUI 26 display at input device 22. Communication module 14 may also associate the descriptive data of the contextual identifiers collected with the image capture device 19, audio capture device 20, and network communication device 18 with the other descriptive data.

Server device 30 includes a call log module 32, a user services module 34 and location module 36. Client device 10 may later send the contextual identifiers to server device 30. Alternatively, server device 30 may store and associate the call with the contextual identifiers and the indications. In some examples, communication application 12 may automatically send the descriptive information in some examples, while in other examples communication application 12 may request a user input from user 2 to cause communication application 12 to send the descriptive information. In some examples client device 10 may further send indications, user-defined tags, or any other data that is descriptive of the call.

In the example of FIG. 1, communication module 14 of client device 10 may send call data to server device 30. Call log module 32 of server device 30 may receive the call data, which may include contextual identifiers and indications of the call. Server device 30 may also identify additional contextual identifiers. For example, user services module 34 may identify user services related data associated with client device 10, such as data related to at least activities, calendar events, applications on client device 10, and weather at the client device 10. User services module 34 may use indications to identify user services related data. Such user services data 46 may be stored in user services store 38. Alternatively, user services related data may be retrieved by user services module 34 and may use indications and tags to retrieve data and may store user services related data in user services store 38 as user services data 46.

In another example, location module 36 may send data related to the location of computing device 10 to call log module 32. Location store 42 may store location data 49 and may send location data 49 to call log module 32. Alternatively, location module 36 may retrieve location related data associated with client device 10. The location module 36 may use indications or other tags to retrieve location related data and may store the data in location store 42 as location data 49.

Location module 36 sends location data 49 to call log module 32. Call log module 32 may associate location data 49 with the indications, tags, and contextual identifiers for that call, and call log 32 may store location data 49 with the associated data. The request may include data about the call from client device 10, which call log module 32 may use to retrieve contextual identifiers that may be further associated with a user. The user may be associated with a call log service, such that the user has an account in the call log service, and the user may be associated with a social networking service, where other users of the networking service may be identified as associated with the user's social network or as one of the user's contacts. Call log module 32 receives the request for contextual identifiers, causing call log module 32 to retrieve contextual identifiers associated with the call.

For example, call log module 32 may cause user services module 34, as shown in FIG. 1, to generate contextual identifiers based on user services related data, e.g. stored user serviced data 46. In one example, user services module 34 may determine a calendar event, weather or that the user was executing any of applications 16, as illustrated in FIG. 1, such as executing a web browser, texting, or playing games with client device 10. User services module 34 may identify a single contextual identifier at the time when the call was answered, missed or terminated, or may identify multiple contextual identifiers and send them to call log module 32.

In another example, location module 36 may identify other communication devices, different from the user, that are within physical proximity to the user and associated with the user's communication service with server device 30, for example the location of a communication device 3. Each user's communication device, respectively 3 and 10, may send information to server device 30 that implements these techniques. Information associated with the communication devices may include a device identifier, location data, and time information associated with the location information. Location data may include the geolocation, audio-fingerprinting, proximity detection, or calendar data. Server device 30 may determine a geo-location of client device 10. Server device 30 may determine that two or more communication devices were located within a predetermined distance of each other at the approximate time of the call. Location data may also include the location of client device 10 at the approximate time the call occurred. Location data may also identify stored information, such as the stored contact information of user 2, which may include address data of one of the contacts of user 2. Location data may also include data not stored at client device 10, such as an identified location associated with a business, such as "ABC Movie Theater."

User services module 34 may communicate with location module 36 to identify contextual identifiers. For example, location module 36 may determine that one or more other communication devices associated with the user's social network are within a predetermined proximity of client device 10. Location module 36 may send the identified location and identified communication data to user services module 34, which identifies the other communication devices as within the social network of user 2 and determines a relationship strength in the social network. In one example, the user may be with another person who is in the user's social network. When a call occurs, and client device 10 can determine an identity of the other person who was with the user (for example, based on information from a communication device associated with the person) client device 10 may include the identity of the person as a contextual identifier. Techniques used to identify the other person may include proximity detection. Identifying the other person may also include determining if the person is associated with a social networking service of user 2. User services module 34 may send the identified person data, along with other identified information such as location, to call log module 32 as identified contextual identifiers.

User services module 34 may determine that client device 10 is moving or is in a specific position (e.g., sitting, standing, etc.). User services module 34 may determine that client device 10 is engaging in an activity (e.g., bicycling). Location module 36 may communicate with user services module 34 to determine movement, position, or activity of client device 10.

User services module 34 may send the contextual identifier data to call log module 32. Call log module 32 may associate user services data 46 with other indications, tags, and contextual identifiers for that call, and call log 32 may store user services data 46 with the associated data. Location module 36 may send the identified contextual identifiers to call log module 32. Techniques of this disclosure may include identifying a single person or multiple people, locations, events, etc.

Call log module 32 of server device 30 may send the contextual identifiers, which may include at least one of user services data 46 and location data 49, to client device 10. Communication module 14 may receive the contextual identifiers retrieved by call log module 32. In response to receiving the contextual identifiers, communication module 14 may cause output device 24 to display GUI 26. Initially, GUI 26 may display the list of contextual identifiers stored in at least one data structure for a call in call entry 5A. As illustrated in FIG. 1, call entry 5A is an example of a call entry that displays the name and time of a call with the contextual identifiers received by server device 30, such as the location and the activity. Additionally, call entry 5A displays the contextual identifiers entered at computing device 10, such as an image file 21 (including photos and videos), an audio file 23, and a text file 25. In some examples, image file 21, audio file 23, and text file 25 may be icons that link to the corresponding files when interacted with. Call entry 5A may also display a symbol 29 that indicates whether the call was answered, missed or terminated. All of the call entries received from server device 30 and client device 10, including all contextual identifiers, indications, tags, and associated data, may be stored at client device 10 in a data structure.

GUI 26 may allow user 2 to filter the data for all call entries displayed at GUI 26. For example, user 2 may filter the data by selecting one of the buttons display in filter row 5B of GUI 26. A button may be a virtual or a physical button, for example. Filter row 5B may include filter buttons for filtering the contextual identifiers. Filter buttons may be displayed in filter row 5B, that when activated, filter a particular category of contextual identifiers. The particular categories may relate to a data type, such as a file type (e.g., image, text, audio, etc.) or it may be a term used to describe the contextual identifier. The filter buttons may include categories of the contextual identifiers, such as photo button 27-A, time button 27-B, place button 27-C, and activity button 27-D.

Selecting one of the filter buttons of filter row 5B may cause client device 10 to display all call entries with contextual identifiers associated with the filter button category. Call entries that do not include contextual identifiers with data in the selected filter button category will not be displayed at GUI 26. User 2 may scroll through the filtered list of call entries at GUI 26. For example, user 2 may select photo button 27-A, causing GUI 26 to display only call entries with contextual identifiers that include photos or videos, such as photo 21. Pressing one of the filtering buttons of filter row 5B may cause client device 10 to filter the contextual identifiers based on the identified category. For example, pressing photo button 27-A may cause client device 10 to search the data structure for photo files. When client communication module 14 locates at least one photo file, then GUI 26 displays only the call entries with located photo files.

In some examples, GUI 26 may allow user 2 to search the data structure by including all the call entries with associated contextual identifiers in an initial output. GUI 26 may allow user 2 to input contextual search query terms in a contextual input area, such as search row 5C, to query the data structure of contextual identifiers by using searching techniques, such as, for example, string matching and confidence scoring, to identify contextual identifiers in the data structure that match the search query entered by user 2. As illustrated in FIG. 1, user 2 entered the word "bicycling" as a search term at search query input area of search row 5C. The client device searches the data structure stored, for example, in communication module 14, and identifies the call entries that include "bicycling" and displayed only those entries at GUI 26.

User 2 may customize how the call log appears at GUI 26. For example, certain tags may appear, such as the number, date, time, etc., when viewing the call log entries. Display of the contextual identifiers may be customized. For example, user 2 may assign a hierarchical rank to the category of the contextual identifiers, such that certain contextual identifiers may appear before others.

GUI 26 may allow user 2 to select contextual identifiers, such as photo button 27-A, time button 27-B, place button 27-C, and activity button 27-D. User 2 may deselect these contextual identifiers. Deselecting social groups may result in not identifying the call with the deselected contextual identifier. User 2 may also edit the list of contextual identifiers listed or decline to associate the contextual identifier identified by server device 20 with some or all of the calls that are answered, missed, or terminated. User 2 may also opt out of the caller identification server, so that server device 30 does not generate and identify any of the possible contextual identifiers.

This selection process allows user 2 to control communications of client device 10 and prevent access to data by other users in one or more social networking services that are not associated with the social network of user 2. In another example, GUI 26 may allow user 2 to choose to identify specific users of the social network of user 2. In such examples, user 2 may manually input a user identifier (e.g., email address or social networking username) of the recipient at the display of GUI 26. In other examples, user 2 may choose to not participate in the service, so that server device 30 would not identify contextual identifiers associated with user 2. Alternatively, user 2 may participate in a service that limits the identified contextual identifiers associated with user 2.

Techniques for including a call log with contextual identifiers improves call entry identification and location by automatically identifying contextual identifiers when the call was answered, terminated, or missed. The user may also enter contextual identifiers that may be added to the call entry displayed in the caller log. Additionally, this disclosure allows the user to search the call log and quickly locate a call entry. The disclosure of adding contextual identifiers to call entries in a call log improves call identification and the ability to locate a particular call entry in a call log. Additionally, this disclosure allows the user to search the call log appearing at a GUI of a communication device and quickly locate the call entry.

Figure 2:
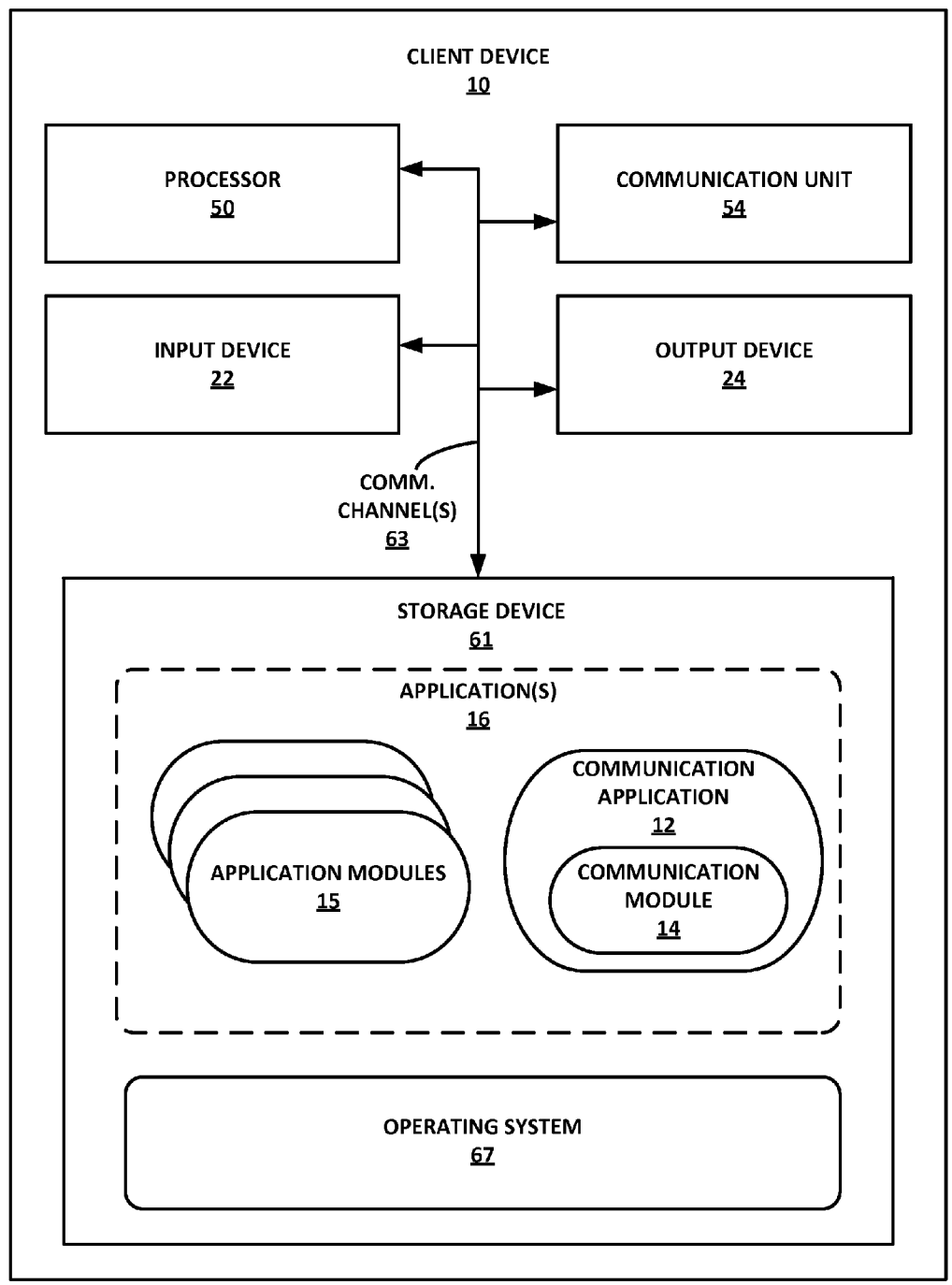
FIG. 2 is a block diagram illustrating an example of a client device that displays a computer implemented searchable caller identification log, in accordance with one or more aspects of the present disclosure.

FIG. 2 is a block diagram illustrating an example of a client device 10 that displays a computer implemented searchable caller identification log, in accordance with one or more aspects of the present disclosure. In one example, client device 10 of FIG. 2 is similar to or the same as client device 10 of FIG. 1. FIG. 2 illustrates only one particular example of client device 10, and many other examples of client device 10 may be used in other instances.

As shown in the specific example of FIG. 2, client device 10 includes one or more processors (for illustration purposes, referred to as "processor 50"), a communication unit 54, one or more storage devices 61 (for illustration purposes, referred to as "storage device 61"), an input device 22, and an output device 24. In some examples, client device 10 includes two or more input devices 22 and output devices 24. Client device 10, in one example, further includes one or more applications (referred to as "applications 16") and operating system 67 that are executable by client device 10.

Each of components 50, 22, 54, 24, and 61 may be interconnected (physically, communicatively, and/or operatively) for inter-component communications via one or more communication channels 63. That is, components 50, 22, 54, 24, and 61 may be coupled by one or more communication channels 63. In some examples, communication channels 63 may include a system bus, network connection, interprocess communication data structure, or any other channel for communicating data.

Applications 16 includes at least one application module (referred to as "application modules 15"). Applications 16, for example, may include communication application 12 and communication module 14. Applications 16 and operating system 67 may also communicate information with one another as well as with other components in client device 10.

Processor 50, in one example, is configured to implement functionality and/or process instructions for execution within server device 30. For example, processor 50 may be capable of executing instructions stored in storage device 61.

Storage device 61 may be configured to store information within client device 10 during operation. Storage device 61, in some examples, is described as a computer-readable storage medium. In some examples, storage device 61 is a temporary memory, meaning that a primary purpose of storage device 61 is not long-term storage. Storage device 61, in some examples, is described as a volatile memory, meaning that storage device 61 does not maintain stored contents when the computer is turned off. Examples of volatile memories include random access memories (RAM), dynamic random access memories (DRAM), static random access memories (SRAM), and other forms of volatile memories known in the art. In some examples, storage device 61 is used to store program instructions for execution by processor 50. Storage device 61, in one example, is used by software or applications running on client device 10 (e.g., applications 16) to temporarily store information during program execution.

Storage device 61, in some examples, also includes one or more computer-readable storage media. Storage device 61 may be configured to store larger amounts of information. Storage device 61 may further be configured for long-term storage of information. In some examples, storage device 61 includes non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Client device 10, in some examples, also includes one or more communication units 54. Client device 10, in one example, utilizes communication unit 54 to communicate with external devices via one or more networks, such as one or more wireless networks. Communication unit 54 may be a network interface card, such as an Ethernet card, an optical transceiver, a radio frequency transceiver, or any other type of device that can send and receive information. Other examples of such network interfaces may include Bluetooth, 3G and WiFi radios computing devices as well as USB. In some examples, client device 10 utilizes communication unit 54 to wirelessly communicate with an external device such as client device 10 of FIG. 1, or any other computing device.

Client device 10, in one example, also includes one or more input devices (for illustration purposes, referred to as "input device 22"). In some examples, input devices 22 are configured to receive input from a user through tactile, audio, or video input. Examples of input device 22 include a presence-sensitive screen, a mouse, a keyboard, a voice responsive system, video camera, microphone or any other type of device for detecting a command from a user. In some examples, a presence-sensitive screen includes a touch-sensitive screen.

One or more output devices (for illustration purposes, referred to as "output device 24") may also be included in client device 10. Output device 24, in some examples, is configured to provide output to a user using tactile, audio, or video output. Output device 24, in one example, includes a presence-sensitive screen. Output devices 24 may utilize a sound card, a video graphics adapter card, or any other type of device for converting a signal into an appropriate form understandable to humans or machines. Additional examples of output device 24 include a speaker, a cathode ray tube (CRT) monitor, a liquid crystal display (LCD), or any other type of device that can generate intelligible output to a user.

Client device 10 may include operating system 67. Operating system 67, in some examples, controls the operation of components of client device 10. For example, operating system 67, in one example, facilitates the interaction of applications 16 with processor 50, communication unit 54, storage device 61, input device 22, and output device 24. As shown in FIG. 2, applications 16 may include communication module 14 and application modules 15. Applications 16 may include program instructions and/or data that are executable by client device 10. As one example, communication module 14 may include instructions that cause client device 10 to perform one or more of the operations and actions described in the present disclosure.

In accordance with aspects of the present disclosure, communication application 12 may be executed by the user or by an incoming call from a different communication device, such as communication device 3 of FIG. 1, causing communication module 14 to indicate that the call is missed, terminated, or answered. Client device 10 may send a request for contextual identifiers via communication unit 54 to a remote server device, not illustrated in FIG. 1. Communication unit 54 may receive the list of contextual identifiers from the remote server device. The contextual identifiers are stored at storage device 61. Communication module 14 may organize and store the contextual identifiers in a data structure. Communication module 14 sends the data structure to output device 24 to display the contextual identifiers with the associated call information in a call log. The call log is searchable. Search terms or filtering requests entered by user at input device 22 may cause communication module 14 to generate a list of call log entries. The data structure may receive a call or may make a call from client device 10 for generating contextual identifiers for call identification.

For example, communication module 14, as shown in FIG. 2, may receive the search query input from input device 22, causing communication module 14 to initiate matching. Communication module 14 may compare the search term to contextual identifiers in the data structure. Communication module 14 may use string matching techniques to identify call log entries that contain matching or similar contextual identifiers. In other examples, communication module 14 may also generate a confidence value indicating the probability that a portion of the search query matches the contextual identifier associated with a call. The confidence value indicates a degree of similarity between the one or more characteristics of the selected object and one or more characteristics associated with the social group, wherein the degree of similarity is within a range of degrees of similarity. The probability, or confidence score, may be compared to a predetermined value to determine if the probability is greater than the predetermined value. When the probability is greater than a predefined value, image recognition module 32 selects the call entry with the associated contextual identifiers. Communication module 14 may send the selected call entries to output device 24. In yet other examples, communication module 14 may use a contextual characteristic that is contextually related to a characteristic of the contextual identifier. A semantic relationship may exist between the contextual characteristic and the characteristic associated with the social group. An example of a semantic relationship between the contextual characteristic and characteristics of the associated contextual identifier is as described in FIG. 1, when the input query term entered at the "search" field is "sport" or "cycle" or "team," communication module 14 may associate characteristics such as "bicycling" with the query term. Communication module 14 may determine that user 2 has a call log entry that includes the term "bicycling."

Alternatively, searching the call log may be accomplished by server device 30 when the user inputs a search query, such as a search term, at input device 22, causing client device 10 to send the query request to server device 30. Client device 10 receives the results of the query and displays the results at output device 24.

Figure 3:
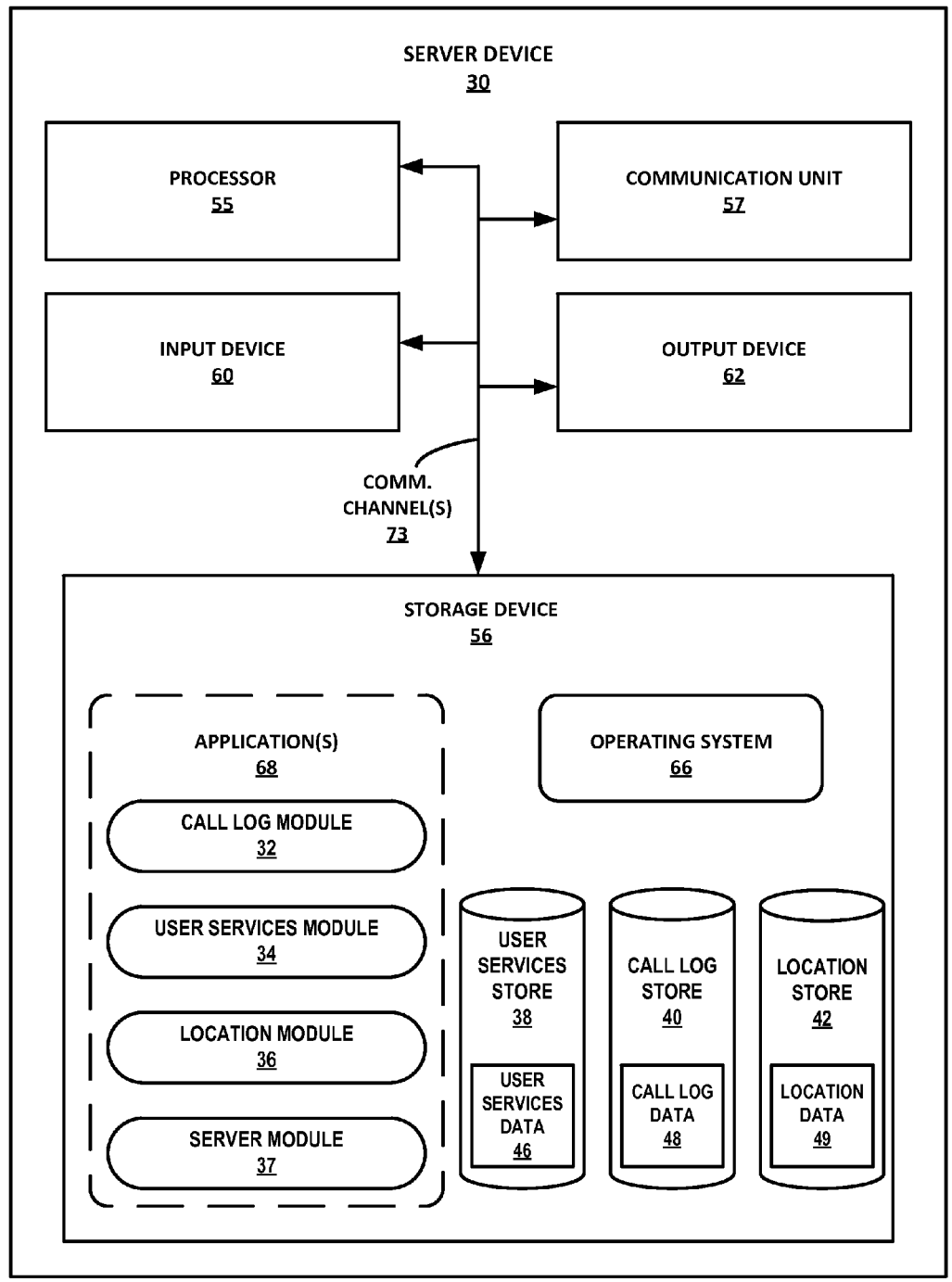
FIG. 3 is a block diagram illustrating an example of a server device that includes a computer implemented caller identification service, in accordance with one or more aspects of the present disclosure.

FIG. 3 is a block diagram illustrating an example of server device 30 that provides a computer implemented caller identification service, in accordance with one or more aspects of the present disclosure. In one example, server device 30 of FIG. 2 may be similar to or may be the same as server device 30 of FIG. 1. FIG. 3 illustrates only one particular example of server device 30, and many other examples of server device 30 may be used in other instances.

As shown in the specific example of FIG. 3, server device 30 includes one or more processors (for illustration purposes, referred to as "processor 55"), a communication unit 57, one or more storage devices 56 (for illustration purposes, referred to as "storage device 56"), an input device 60, and an output device 62. In some examples, server device 30 includes two or more input devices 60 and output devices 62. Server device 30, in one example, further includes applications 68 and operating system 66 that are executable by server device 30.

Each of components 55, 60, 57, 62, and 56 may be interconnected (physically, communicatively, and/or operatively) for inter-component communications via one or more communication channels 63. That is, components 55, 60, 57, 62, and 56 may be coupled by one or more communication channels 73. In some examples, communication channels 73 may include a system bus, network connection, interprocess communication data structure, or any other channel for communicating data.

Applications 68 (includes modules 32, 34, 36, and 37) and operating system 66 may also communicate information with one another as well as with other components in server device 30. Components 70, 71, 60, 62, and 56 may operate similarly as described for client device 10 in FIG. 2, processing instruction in server device 30.

Processor 55, in one example, is configured to implement functionality and/or process instructions for execution within client device 10. For example, processor 55 may be capable of executing instructions stored in storage device 56.

Storage device 56 may be configured to store information within server device 30 during operation. Storage device 56, in some examples, is described as a computer-readable storage medium. In some examples, storage device 56 is a temporary memory, meaning that a primary purpose of storage device 56 is not long-term storage. Storage device 56, in some examples, is described as a volatile memory, meaning that storage device 56 does not maintain stored contents when the computer is turned off. Examples of volatile memories include random access memories (RAM), dynamic random access memories (DRAM), static random access memories (SRAM), and other forms of volatile memories known in the art. In some examples, storage device 56 is used to store program instructions for execution by processor 55.

Storage device 56, in some examples, also includes one or more computer-readable storage media. Storage device 56 may be configured to store larger amounts of information. Storage device 56 may further be configured for long-term storage of information. In some examples, storage device 56 includes non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Server device 30, in some examples, also includes one or more communication units 54. Server device 30, in one example, utilizes communication unit 57 to communicate with external devices via one or more networks, such as one or more wireless networks. Communication unit 57 may be a network interface card, such as an Ethernet card, an optical transceiver, a radio frequency transceiver, or any other type of device that can send and receive information. Other examples of such network interfaces may include Bluetooth, 3G and WiFi radios computing devices as well as USB. In some examples, server device 30 utilizes communication unit 57 to wirelessly communicate with an external device such as any other computing device.

Server device 30, in one example, also includes one or more input devices (for illustration purposes, referred to as "input device 60"), that are in some examples, configured to receive input from a user through tactile, audio, or video input. Examples of input device 60 include a presence-sensitive screen, a mouse, a keyboard, a voice responsive system, video camera, microphone or any other type of device for detecting a command from a user. In some examples, a presence-sensitive screen includes a touch-sensitive screen.

One or more output devices (for illustration purposes, referred to as "output device 62") may also be included in server device 30. Output device 62, in some examples, is configured to provide output to a user using tactile, audio, or video output. Output device 62, in one example, includes a presence-sensitive screen. Output devices 62 may utilize a sound card, a video graphics adapter card, or any other type of device for converting a signal into an appropriate form understandable to humans or machines. Additional examples of output device 62 include a speaker, a cathode ray tube (CRT) monitor, a liquid crystal display (LCD), or any other type of device that can generate intelligible output to a user.

Server device 30 may include operating system 66. Operating system 66, in some examples, controls the operation of components of server device 30. For example, operating system 66, in one example, facilitates the interaction of applications 68 with processor 55, communication unit 57, storage device 56, input device 60, and output device 62. As shown in FIG. 2, applications 68 may include call log module 32, user services module 34, location module 36 as also illustrated in FIG. 1, and may additionally include server module 37. Server module 37 may communicate with client device 10 and control operations of communication unit 71. Applications 68 may each include program instructions and/or data that are executable by server device 30. As one example, call log module 32 may include instructions that cause server device 30 to perform one or more of the operations and actions described in the present disclosure.

In accordance with aspects of the present disclosure, communication unit 57 may receive a request from client device 10 for generating contextual identifiers for call identification. The request may include data about the call from client device 10. Call log module 32 may use the data to retrieve contextual identifiers that may be further associated with a user. The user may be associated with a call log service, such that the user has an account in the call log service, and the user may be associated with a social networking service, where other users of the networking service are identified as associated with the user's social network or as one of the user's contacts. Call log module 32 receives the request for contextual identifiers, causing call log module 32 to retrieve contextual identifiers associated with the call.

For example, call log module 32 may cause user services module 34, as shown in FIG. 3, to generate contextual identifiers based on user services related data, e.g., stored user serviced data 46. In one example, user services module 34 may determine that an event was scheduled in a calendar or identified in the user's social networking service that is associated with the user approximately when the call was answered, missed, or terminated. For example, user services module 34 may identify that a different user identifies a member of the user's social group may have the same event identified in their social networking services. In another example, user services module 34 may determine that the user was executing any of applications 16, as illustrated in FIG. 1, such as executing a web browser, texting, or playing games with client device 10. Examples of contextual identifiers retrieved from applications 16 of FIG. 1 or applications 68 of server device 30 of FIG. 3, may include the ambient weather of the client device 10, where user serviced module 32 may identify weather status, such as "thunderstorms" or "high winds" and send the weather data to call log module 32.

For example, call log module 32 may cause user services module 34, as shown in FIG. 1, to generate contextual identifiers based on user services related data, e.g. stored user serviced data 46. In one example, user services module 34 may determine that an event was scheduled in a calendar or identified in the user's social networking service that is associated with the user approximately when the call was answered, missed, or terminated. For example, user services module 34 may identify that a different user identifies a member of the user's social group may have the same event identified in their social networking services. In another example, user services module 34 may determine that the user was executing any of applications 16, as illustrated in FIG. 1, such as executing a web browser, texting, or playing games with the client device 10. Examples of contextual identifiers retrieved from applications 16 of FIG. 1 or applications 68 of server device 30 of FIG. 3, may include weather, where user serviced module 32 may identify weather status, such as "thunderstorms" or "strong winds" and send the weather data to call log module 32. User services module 34 may identify a single contextual identifier at the time when the call was answered, missed or terminated, or may identify multiple contextual identifiers and send them to call log module 32. User services module 34 sends the identified contextual identifiers to call log module 32. Call log module 32 continue retrieving contextual identifiers by sending a request to location module 36.

In another example, location module 36 may identify other communication devices, different from the user, that are within physical proximity to the user and associated with the user's communication service with server device 30, for example the location of a communication device 3. Each user's communication device, for example, smartphones, may send information server device 30 that implements these techniques. Information associated with the communication devices may include a device identifier, location data, and time information associated with the location information. Location data may include the geolocation, audio-fingerprinting, proximity detection, or calendar data. The remote server may determine the geo-location information and associated time information that the two or more smartphones were physically located within a predetermined distance at the approximate time of the call. Location data may also include the location of client device 10 at the approximate time of the call. Location data may also identify stored information, such as stored contact information of user 2, which may include address data of one of the user's contacts. Location data may also include non-client device 10 data, such as an identified location associated with a business, such as "ABC Movie Theater." Location module 36 may also identify a common event of user 2 and communication device 3. Server device 30 may determine that communication device 3, or other user data, should be identified as the contextual identifier based on various determining factors. For example, distance proximity may identify communication device 3 as the closest in proximity or within a predetermined distance. Another basis may be a relationship strength in the social network is relationship strength based on a determining a relationship strength value of members associated with user 2's social networking service (e.g., determining a member of a friends group is a stronger relation that a member of an acquaintance group).

User services module 34 may determine that client device 10 is moving or in a specific position (e.g., sitting, standing, etc.). User services module 34 may determine that client device 10 is engaging in activity (e.g., bicycling). Location module 36 may communicate with user services module 34 to determine movement, position, or activity.

User services module 34 may send the contextual identifier data to call log module 32. Call log module 32 may associate user services data 46 with other indications, tags, and contextual identifiers for that call, and call log 32 may store user services data 46 with the associated data. Location module 36 may send the identified contextual identifiers to call log techniques of this disclosure may include identifying a single person or multiple people, locations, events, etc.

Figure 4:
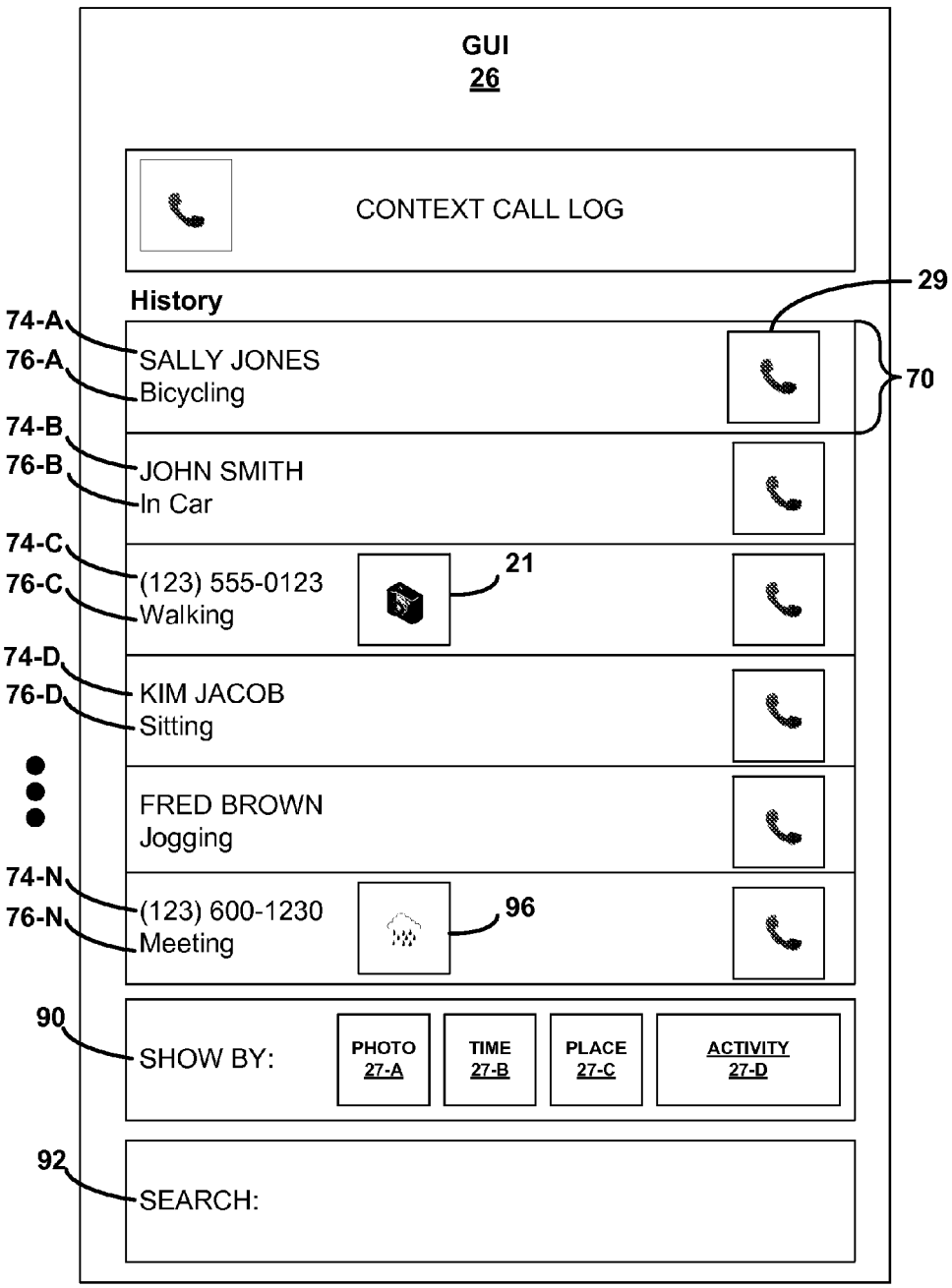
FIG. 4 is a block diagram illustrating an example of a graphical user interface display based on the caller identification log received by a communication device, in accordance with one or more aspects of the present disclosure.

FIG. 4 is a block diagram illustrating an example of a graphical user interface display based on the caller identification log received by a communication device, in accordance with one or more aspects of the present disclosure. In one example, FIG. 4 is an illustration of the graphical user interface of the client device of FIG. 1.

The output displayed at GUI 26 may be a graphical representation of a data structure. Each call entry listed, for example one of the call entries illustrated in FIG. 4, e.g., a first call entry 70, identifies the associated data associated with the related call. For example, as illustrated in FIG. 4, first call entry 70 includes contextual identifiers associated with the call, such as the call is associated with an identified caller 74-A, associated with a different user such as communication device 3, and an activity 76-A that a user, such as user 2, was engaged in when the call occurred. In the example of first call entry 70, identified caller 74-A is a name "Sally Jones" and an activity 76-A is "Bicycling." As used herein, identified caller 74-A through 74-N are referred to collectively or individually as an "identified caller 74" and activities 76-A through 76-N are referred to collectively or individually as an "activity 76." "N" as used herein functions as a variable associated with the respective call entry of the plurality of displayed call entries that is based on the number of items displayed.

In FIG. 4, four buttons appear in filter row 90 that the user may interact with to initiate filtering of the call log entries. Each button initiates selection of a predetermined category, such as photo button 27-A, time button 27-B, place button 27-C, and activity button 27-D, when the user selects the filter button appearing at GUI 26. For example, the underlining of activity button 27-D indicates that activity button 27-D was selected. Selecting activity button 27-D filters the contextual identifiers displayed by activity 76, causing GUI 26 to display only the contextual identifiers with activity related data.

For some calls, a name as identified caller 74 is unavailable. In such an example, a number may be included as identified caller 74 instead of a name. Each call entry may first list metadata related to the name 74 or a number 80. The listed "activity" may include contextual identifiers identified in this disclosure identifying the activity that the user may have been engaged in, e.g., what the person is doing (e.g., walking 76-C, an orientation of the mobile communication device related to the user sitting, lying or standing 76-D, or a calendar based event (e.g., in a meeting 76-N)). In the illustrated example of FIG. 4, contextual identifiers may be displayed below the name or number, such as displaying activity related contextual identifiers. For example, activity 76 identifies what the user was doing when the call occurred. For example, "In Car" for activity 76-B represents an activity, such as the user being in the car when the call from identified caller 74-B "John Smith" occurred, such as driving or at an event.

The data structure may also include the indication of the phone call being answered, missed, or terminated with a symbol, such as symbol 29, in addition to the identified contextual identifiers. The user may search the filtered list, for example the call entries associated with "activity" related contextual identifiers. Alternatively, the user may "unfilter," or broaden, the call log by deselecting the activity filter. Techniques for turning off the activity filter may include selecting activity button 27-D, removing the underlining of the "Activity," indicating that the filter is turned off. Alternative techniques for identifying that the filter is on or off are also possible to implement with the method of this disclosure.

As discussed in this disclosure, client device 10 of FIG. 1 can generate contextual identifiers, such as image data, audio data, and textual data. Client device 10 stores the data in a file (e.g., image file, audio file, and text file). The files are associated with the call entry and an icon is displayed at GUI 26 identifying the associated file and can be used for filtering the call log entries. For example, FIG. 4 illustrates that an image file 21 indicates that an image was associated with the call when the call was answered, missed, or terminated. The user may view the image by pressing on a "camera" button representing image file 21. Additionally, client device 10 at GUI 26 may display an associated audio file 23 and text file 25, as illustrated in FIG. 1, identifying the associated contextual identifier.

Figure 5:
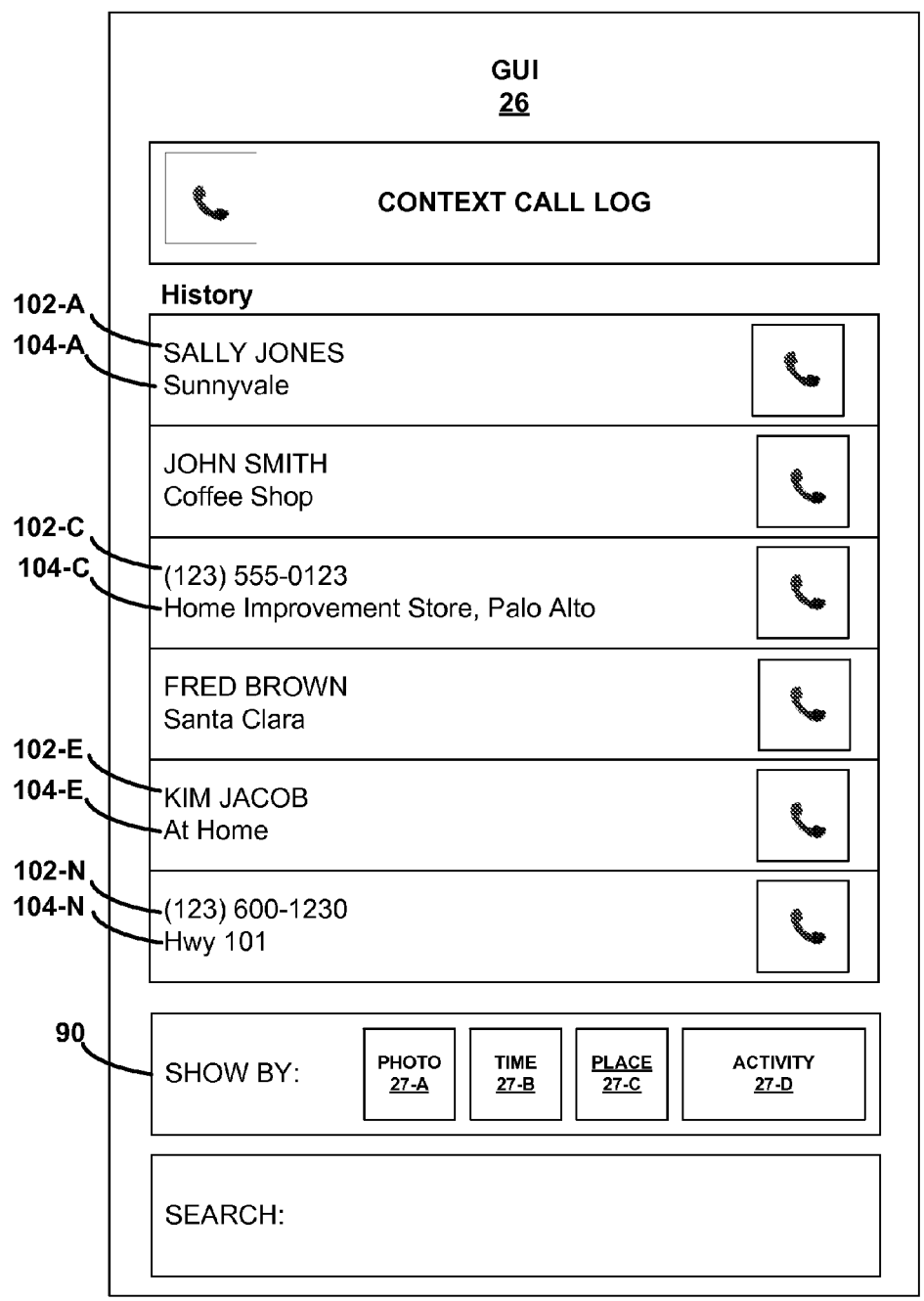
FIG. 5 is a block diagram illustrating an example of a graphical user interface display based on the caller identification log received by a communication device, in accordance with one or more aspects of the present disclosure.

FIG. 5 is a block diagram illustrating an example of a graphical user interface display based on the caller identification log received by a communication device in accordance with one or more aspects of the present disclosure. In one example, FIG. 5 is an illustration of the graphical user interface of the client device of FIG. 1. The output displayed at GUI 26 is a graphical user interface of the client device FIG. 1. The client device may initiate filtering of the call log entries by "place" as indicated by underlined text of place button 27-C of filter row 90. As illustrated, the filtered call entries include "place" related contextual identifiers. Place related contextual identifiers may include a location related contextual identifier received from a remote server, identified using techniques of this disclosure. For example, as illustrated in FIG. 5, the call entry may display identified caller 102A-N and a contextual identifier related to a location or "place" where the user may have been at the time when the call occurred identifies, such as and identified location 104A-N.

Identified locations 104A-N may include information related to geographic, geoposition, point of interest, business name, address or user identified location. In the example of the first call entry, identified caller 102A is "Sally Jones" and the place associated with the user at the time that the call occurred is the city of "Sunnyvale." In another example, when the call occurred from identified caller "(123) 555-0123" 102-C, the identified location 104-C was at "Home Improvement Store" in the city of "Palo Alto." In the third example, the business name "Home Improvement Store" and the city "Palo Alto" appear together in the call entry as identified locations 104-C. Location information may include geolocation information, such as cities, states, or points of interest. Location information may also include an address or partial address (e.g., "Hwy 101" 104N). In other examples, "place" identification may additionally be based on stored contact data, calendar data or data stored in other applications. For example, the user's home address may be named "Home" and stored in contacts. In other examples, the client device may identify the user's location via executed applications of the client device at the time that the call occurred.

Figure 6:
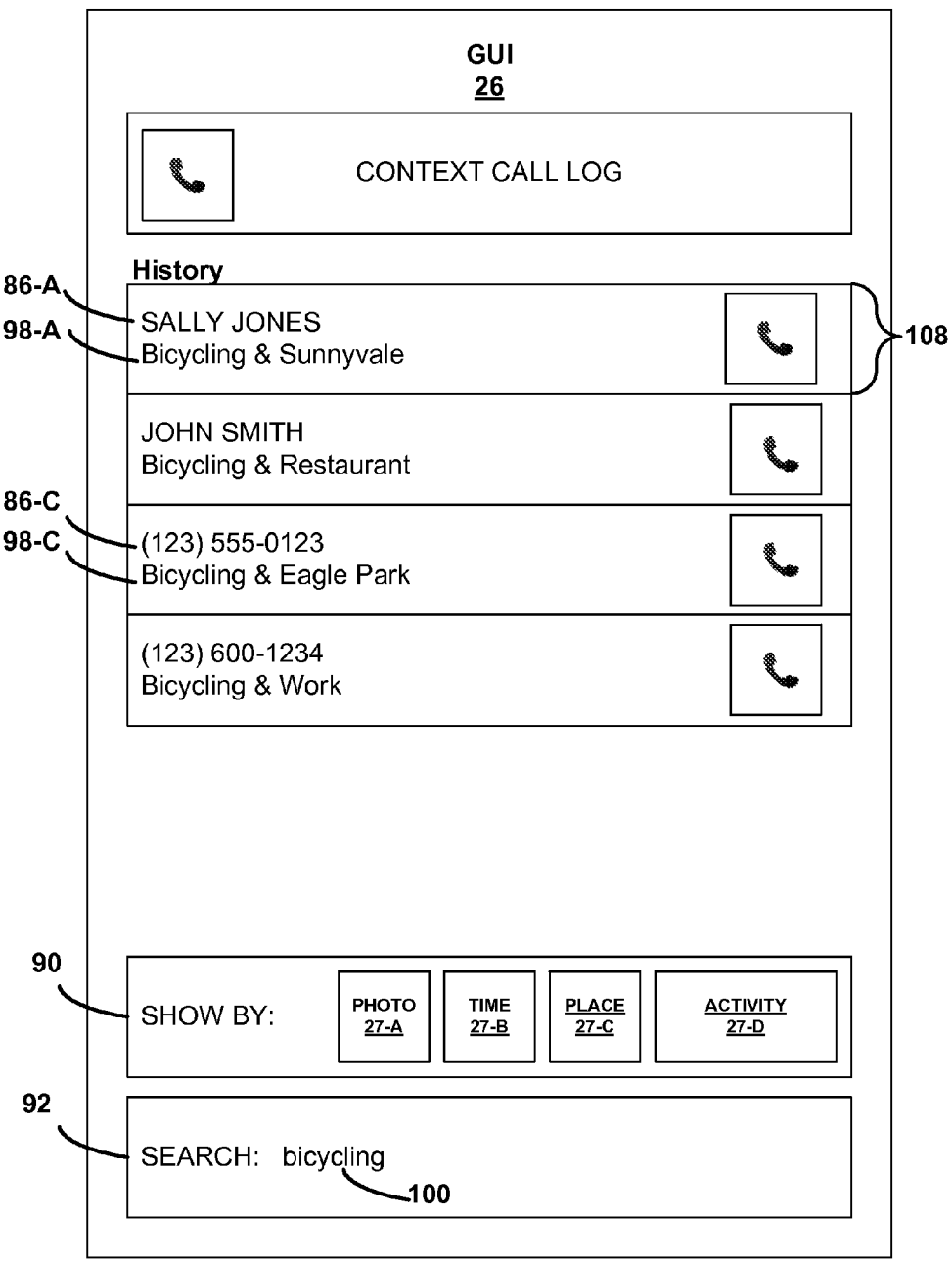
FIG. 6 is a block diagram illustrating an example of a graphical user interface display based on the caller identification log received by a communication device, in accordance with one or more aspects of the present disclosure.

The client device may activate multiple filters may at the same time. For example, as illustrated in FIG. 6, "place" filter and "activity" filter are both initiated as illustrated by underlined text of place button 27C and activity button 27D. Initiating multiple filters causes the call log to list all entries with associated contextual identifiers. For example, call log entry 72 identifies the activity as "bicycling" and the place as "Sunnyvale."

FIG. 6 is a block diagram illustrating an example of a graphical user interface display based on the caller identification log received by a communication device in accordance with one or more aspects of the present disclosure. In one example, the contextual identifiers are based on searchable tags and searchable metadata. For example, the user may input a search term 100 at a search field 92 of GUI 26, such as "bicycling." Search term 100 may be a query entered at GUI 26 causing communication device 10 to use search techniques to locate call log entries that are associated with contextual identifiers that match search term 100. In the example of FIG. 6, the call entries illustrated all include matched search term 100 as a contextual identifier (i.e., "Bicycling").

Generally, searching finds call entries related to the search term. FIG. 6 illustrates how the call entries listed after a search may also be filtered. The call entries were filed at filter row 90 by place button 27C and activity button 27D, such that the contextual identifiers are displayed showing activity and place data. The first call entry 108 has two contextual identifiers "Bicycling & Sunnyvale" 98-A that identify respectively the activity and the place associated with the client device when the call occurred. The third call entry includes identified caller "(123) 555-0123" 86-C with both activity "Bicycling" and place "Eagle Park" 98-C. In the example of FIG. 1, the contextual identifiers displayed are the result of the search query and the filters used.

Techniques may include client device 10 comparing the contextual identifiers of the data structure with the search query, or search term 100. The tags and metadata, which the contextual identifier is at least partially based on, are compared to search term 100. As a result of the search, communication device 10 may identify at least one contextual identifier from the data structure that is responsive to the search query. The identified contextual identifiers are returned by, for example, communication module 14 as illustrated in FIG. 1, and the contextual identifiers are displayed at GUI 26 with the associated call data. The list of call entries that include the identified call entries may appear at GUI 26 in a list appearing as call log entries. Other search techniques may include generating a confidence value indicating the probability that a portion of the search query matches the contextual identifier associated with a call. As described in this disclosure, the confidence value indicates a degree of similarity between the one or more characteristics of the entered search term 100 and the one or more selected contextual identifier, or the tag of the contextual identifier associated with the call. The degree of similarity may be within a range of degrees of similarity. The probability, or confidence score, may be compared to a predetermined value to determine if the probability is greater than the predetermined value. When the confidence value is greater than a predetermined value, communication module 14 then selects the contextual identifier as an identified match to the search query.

Figure 7:
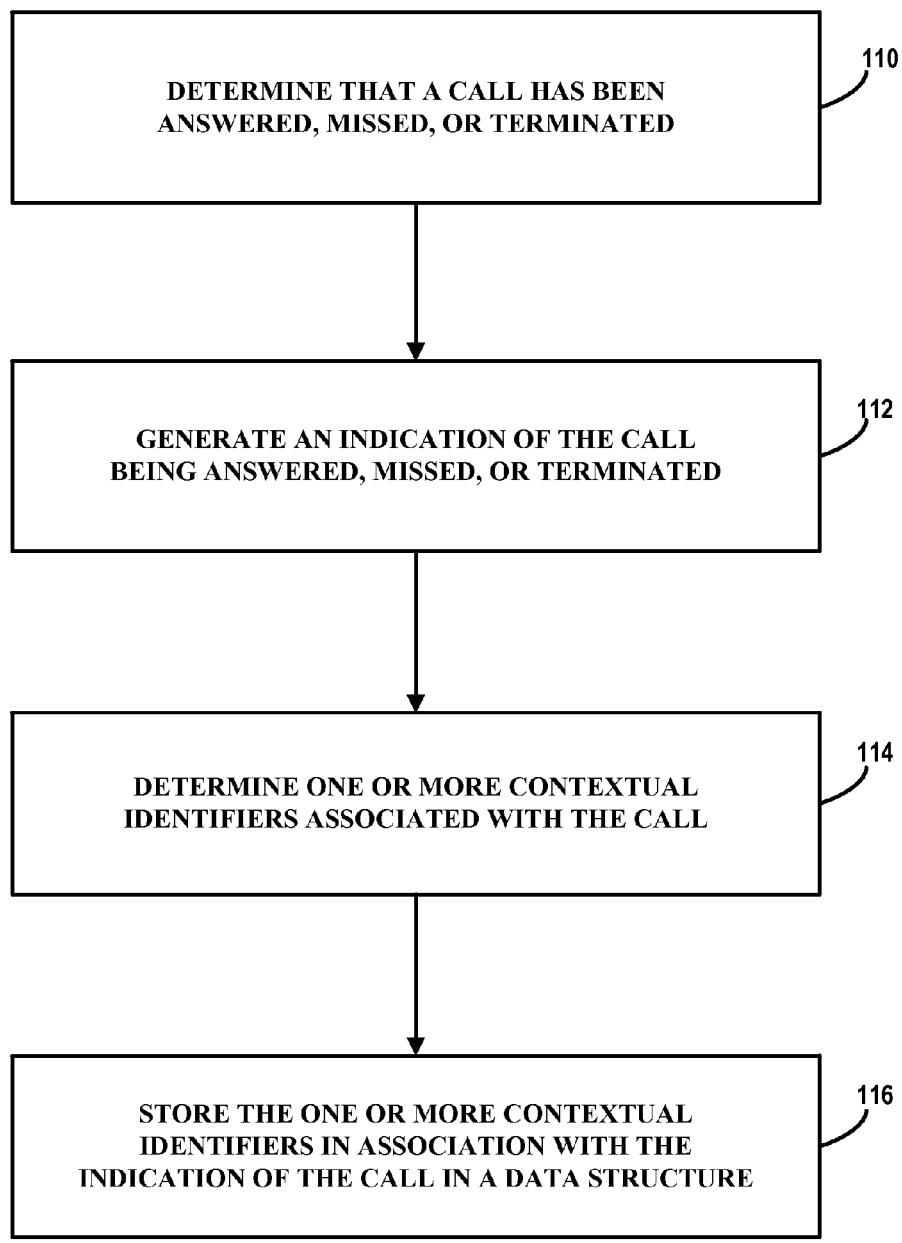
FIG. 7 is a flowchart illustrating an example of a client device determining and storing a searchable caller identification information, in accordance with one or more aspects of the present disclosure.

FIG. 7 is a flowchart illustrating an example of the client device determining and storing searchable caller identification information, in accordance with one or more aspects of the present disclosure. In one example, client device 10 of FIG. 1 may perform the method of FIG. 7. For purposes of illustration only, the example operations are described below within the context of server device 20 and client device 10 as shown in FIG. 1.

In one example, client device 10 determines that a phone call has been answered, missed, or terminated by the communication device (110). An example of the phone call being received is if the user accepts the call. An example of the call being missed is if the user does not accept the call or the call goes to voicemail. An example of a terminated call is when the user accepts the call and then the call is subsequently ended. The terminated call may be an outgoing call, where the user is attempting to contact someone.

Client device 10 may generate at GUI 26 an indication of the phone call being answered, missed, or terminated (112). An example of the generated indication at GUI 26 is different graphical representations for each one of answered, missed, or terminated. Client device 10 may determine one or more contextual identifiers associated with the phone call and include metadata associated with the phone call (114). Additionally, client device 10 may send a request for additional contextual identifiers associated with the call to server device 30. Server device 30 may generate contextual identifiers and send the identified contextual identifiers to client device 10. In some examples, client device 10 may display the contextual identifiers at the graphical user interface associated with client device 10. In one example, the contextual identifiers determined by client device 10 (or the communication device) from the first input include at least one of image data, audio data, and textual data.

In another example, the contextual identifiers are further based on an activity with the communication device, including application execution data. In yet another example, the contextual identifiers are further based on at least one of motion data, video data, and audio data. In other examples, at least some of the contextual identifiers received by the communication device include event data that is based on calendar data. In one example, at least some of the contextual identifiers are further based on weather data received by the communication device. In some examples, the contextual identifiers received by the communication device comprise location information that is based on at least one of geolocation, audio fingerprinting, proximity detection, and calendar data. In yet other examples, the location information is based on data that is stored in a computing device different from the communication device.

In one example, the communication device is a first communication device, and the location information based on proximity detection is based on a predetermined distance of a second, different communication device from the first communication device. In another example, determining a distance based at least in part on a physical proximity of the first communication device to a second communication device, and determining a relationship of the first communication device with the second communication device based on at least one of stored contact data associated with the user or social group data associated with the user.

Client device 10 may store the one or more contextual identifiers in association with the indication of the phone call in a data structure that includes other contextual identifiers associated with other indications of phone calls (116). The associations and data structure may alternatively or additionally be stored at server device 30. The one or more contextual identifiers and the other contextual identifiers included in the data structure are searchable. In response to entering input at the graphical user interface of client device 10, client device 10 may determine one or more contextual identifiers that satisfy a search based at least in part on the entered input at the graphical user interface, the one or more contextual identifiers and the indication of the phone call are determined in response to the search. In another example, the method may include outputting, at the graphical user interface of client device 10 (or the communication device), a graphical representation of the data structure including the association of the indication of the phone call with the one or more contextual identifiers, wherein the data structure is searchable based on at least one of the one or more contextual identifiers.

In another example, the method may include filtering, at the graphical user interface, a display of determined contextual identifiers by selecting one of the types of contextual identifiers. In another example, the method may include searching the contextual identifiers, comprising receiving a search query, comparing the contextual identifiers of the data structure with the search query, identifying, responsive to the search query, at least one identified contextual identifier from the one or more contextual identifiers, and returning the at least one identified contextual identifier and the associated indication of the phone call for display at the graphical user interface associated with the communication device.

In yet another example, searching one or more contextual identifiers in the data structure includes searching all of the contextual identifiers, wherein the contextual identifiers are based at least in part on searchable tags associated with the phone call. In another example, searching the contextual identifiers comprises determining, by the communication device, a confidence value that indicates a likelihood that the searchable tag associated with the phone call matches the contextual identifier, and when the confidence value is greater than a predetermined value, selecting, by the communication device, the contextual identifier. In one example, the user selects from a predetermined list of contextual identifiers the contextual identifiers received by the communication device.

In another example, the method includes limiting contextual identifiers received by the communication device by at least one of deselecting from a predetermined list of contextual identifiers the contextual identifiers received by the communication device, and participating in a privacy service that limits the identified contextual identifiers.

In one example, a computer-readable storage medium comprising instructions for causing a programmable processor of a communication device to determine, by the communication device, that a phone call has been answered, missed, or terminated by the communication device. Instructions may also generate, at a graphical user interface associated with the communication device, an indication of the phone call being answered, missed, or terminated. The processors may further be to determine, by the communication device, one or more contextual identifiers associated with the phone call. The one or more contextual identifiers include metadata associated with the phone call, and the one or more contextual identifiers are based on data associated with at least one of data generated by the communication device and data received by the communication device from a first input at the graphical user interface associated with the communication device. The processors of the computer-readable storage medium may further store the one or more contextual identifiers in association with the indication of the phone call in a data structure that includes other contextual identifiers associated with other indications of phone calls, wherein the one or more contextual identifiers and the other contextual identifiers included in the data structure are searchable. Additionally, the processors may further determine one or more contextual identifiers that satisfy a search based at least in part on a second input received at the graphical user interface, the one or more contextual identifiers and the indication of the phone call are determined in response to the search.

In another example, a communication device includes at least one processor, one or more modules operable by the at least one processor to determine, by a communication device, that a phone call has been answered, missed, or terminated by the communication device. The modules operable by the at least one processor may further generate, at a graphical user interface associated with the communication device, an indication of the phone call being answered, missed, or terminated. The modules may further determine, by the communication device, one or more contextual identifiers associated with the phone call. The one or more contextual identifiers include metadata associated with the phone call, and the one or more contextual identifiers are based on data associated with at least one of generated by the communication device and data received by the communication device from a first input at the graphical user interface associated with the communication device. The processors may further store the one or more contextual identifiers in association with the indication of the phone call in a data structure that includes other contextual identifiers associated with other indications of phone calls, wherein the one or more contextual identifiers and the other contextual identifiers included in the data structure are searchable. The processors may further determine one or more contextual identifiers that satisfy a search based at least in part on a second input received at the graphical user interface, the one or more contextual identifiers and the indication of the phone call are determined in response to the search.

In one example, a remote computing device includes at least one processor, one or more modules operable by the at least one processor to receive, by the remote computing device, an indication of a phone call received at a communication device approximately at a time when the indication was generated. The one or more modules operable by the at least one processor may further identify, by the remote computing device, at least one contextual identifier associated with the communication device and send, by the remote computing device to the communication device, at least one contextual identifier to the communication device.

The techniques of this disclosure use contextual identifiers to improve identifying calls in a call log. The call logs are searchable and filter the call log entries, for example based on the contextual identifiers, to locate and identify individual calls or the call entry.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments of the disclosure have been described. These and other embodiments are within the scope of the following claims.

What is claimed is:

1. A method performed by at least one processor of a communication device, the method comprising:
   determining, by the communication device, that a call has been answered, missed, or terminated by the communication device;
   generating, at a graphical user interface associated with the communication device, an indication of the call being answered, missed, or terminated;
   responsive to determining that the call has been answered, missed, or terminated by the communication device, automatically:
      determining, by the communication device, one or more contextual identifiers associated with the call, wherein the one or more contextual identifiers are based on a geographic location of the communication device at a time of the call, and
      storing the one or more contextual identifiers in association with the indication of the call in at least one data structure that includes other contextual identifiers associated with other indications of other calls, wherein the one or more contextual identifiers and the other contextual identifiers included in the at least one data structure are searchable; and
   determining that the one or more contextual identifiers satisfy a search query based at least in part on a second input received at the graphical user interface, wherein the one or more contextual identifiers and the indication of the call are determined in response to the search query.

2. The method of claim 1, wherein at least one contextual identifier in the at least one data structure is determined by the communication device from a first input that includes at least one of image data, audio data, and textual data.

3. The method of claim 1, further comprising:
   outputting, at the graphical user interface of the communication device, a graphical representation of the at least one data structure indicating an association of the indication of the call with the one or more contextual identifiers, wherein the at least one data structure is searchable based on at least one of the one or more contextual identifiers.

4. The method of claim 1, further comprising:
   categorizing at least one contextual identifier in the at least one data structure by one or more data types based at least in part on metadata received by the computing device.

5. The method of claim 1, wherein at least one contextual identifier in the at least one data structure is further based on an activity with the communication device, including application execution data.

6. The method of claim 1, wherein at least one contextual identifier in the at least one data structure is further based on at least one of motion data, video data, and audio data.

7. The method of claim 1, wherein at least one contextual identifier in the at least one data structure includes event data that is based on calendar data.

8. The method of claim 1, wherein at least one contextual identifier in the at least one data structure is further based on weather data received by the communication device.

9. The method of claim 1, wherein at least one contextual identifier in the at least one data structure is based on location information, the location information being based on at least one of geolocation, audio fingerprinting, proximity detection, and calendar data.

10. The method of claim 9, wherein the location information is based on data that is stored in a computing device different from the communication device.

11. The method of claim 9,
   wherein the communication device is a first communication device, and
   wherein the location information based on proximity detection is based on a predetermined distance of a second, different communication device from the first communication device.

12. The method of claim 11, further comprising:
determining a relationship of the first communication device with the second communication device based on at least one of stored contact data associated with a user or social group data associated with the user.

13. The method of claim 1, further comprising:
filtering, at the graphical user interface, at least one contextual identifier included in the at least one data structure when a data type of the the at least one contextual identifier is selected.

14. The method of claim 1, further comprising:
searching contextual identifiers in the at least one data structure, wherein the searching comprises:
receiving the search query;
comparing contextual identifiers in the at least one data structure with the search query;
identifying, responsive to the search query, the one or more contextual identifiers associated with the indication of the call; and
returning at least one of the one or more contextual identifiers and an indication of the call, for display, at the graphical user interface associated with the communication device.

15. The method of claim 1, further comprising:
searching the contextual identifiers in the at least one data structure based at least in part on a searchable tag associated with the call.

16. The method of claim 14, wherein searching the contextual identifiers in the at least one data structure comprises:
determining, by the communication device, a confidence value that indicates a likelihood that search query matches at least one of the one or more contextual identifiers; and
when the confidence value is greater than a predetermined value, selecting, by the communication device, the at least one of the one or more contextual identifiers.

17. The method of claim 1, further comprising:
receiving an input that indicates a selection of a contextual identifier from a predetermined list of contextual identifiers.

18. The method of claim 1, further comprising:
limiting contextual identifiers received by the communication device based on input to deselect, from a predetermined list of contextual identifiers, at least one of the contextual identifiers received by the communication device; and
participating in a privacy service that limits the contextual identifiers.

19. A non-transitory computer-readable storage medium comprising instructions for causing at least one programmable processor of a communication device to perform operations comprising:
determining that a call has been answered, missed, or terminated by the communication device;
generating, at a graphical user interface associated with the communication device, an indication of the call being answered, missed, or terminated;
responsive to determining that the call has been answered, missed, or terminated by the communication device, automatically:
determining one or more contextual identifiers associated with the call, wherein the one or more contextual identifiers are based on a geographic location of the communication device at a time of the call, and
storing the one or more contextual identifiers in association with the indication of the call in a data structure that includes other contextual identifiers associated with other indications of calls, wherein the one or more contextual identifiers and the other contextual identifiers included in the data structure are searchable; and
determining that the one or more contextual identifiers satisfy a search query based at least in part on a second input received at the graphical user interface, the one or more contextual identifiers and the indication of the call are determined in response to the search query.

20. A communication device comprising:
at least one processor,
one or more modules operable by the at least one processor to:
determine that a call has been answered, missed, or terminated by the communication device;
generate, at a graphical user interface associated with the communication device, an indication of the call being answered, missed, or terminated;
responsive to determining that the call has been answered, missed, or terminated by the communication device, automatically:
determine an activity that a user was engaged in at the communication device at a time when the call occurred;
determine one or more contextual identifiers associated with the call, wherein the one or more contextual identifiers are based on the activity that the user was engaged in at the time when the call occurred, and
store the one or more contextual identifiers in association with the indication of the call in at least one a data structure that includes other contextual identifiers associated with other indications of calls, wherein the one or more contextual identifiers and the other contextual identifiers included in the at least one data structure are searchable; and
determine that the one or more contextual identifiers satisfy a search query based at least in part on a second input received at the graphical user interface, the one or more contextual identifiers and the indication of the call are determined in response to the search query.

21. A communication device comprising:
at least one processor,
one or more modules operable by the at least one processor to:
determine that a call has been answered, missed, or terminated by the communication device;
generate, at a graphical user interface associated with the communication device, an indication of the call being answered, missed, or terminated;
responsive to determining that the call has been answered, missed, or terminated by the communication device, automatically:
determine one or more contextual identifiers associated with the call, wherein the one or more contextual identifiers are based on a geographic location of the communication device at a time of the call, and
store the one or more contextual identifiers in association with the indication of the call in at least one data structure that includes other contextual identifiers associated with other indications of calls, wherein the one or more contextual identifiers and the other contextual identifiers included in the at least one data structure are searchable; and
determine one or more contextual identifiers satisfy a search query based at least in part on a second input received at the graphical user interface, the one or more contextual identifiers and the indication of the call are determined in response to the search query.

22. A method performed by at least one processor of a communication device, the method comprising:
  determining, by the communication device, that a call has been answered, missed, or terminated by the communication device;
  generating, at a graphical user interface associated with the communication device, an indication of the call being answered, missed, or terminated;
  responsive to determining that the call has been answered, missed, or terminated by the communication device, automatically:
    determining, by the communication device, an activity that a user was engaged in at the communication device at a time when the call occurred;
    determining, by the communication device, one or more contextual identifiers associated with the call, wherein the one or more contextual identifiers are based on the activity that the user was engaged in at the time when the call occurred, and
    storing the one or more contextual identifiers in association with the indication of the call in at least one data structure that includes other contextual identifiers associated with other indications of other calls, wherein the one or more contextual identifiers and the other contextual identifiers included in the at least one data structure are searchable; and
  determining that the one or more contextual identifiers satisfy a search query based at least in part on a second input received at the graphical user interface, wherein the one or more contextual identifiers and the indication of the call are determined in response to the search query.

23. A non-transitory computer-readable storage medium comprising instructions for causing at least one programmable processor of a communication device to perform operations comprising:
  determining that a call has been answered, missed, or terminated by the communication device;
  generating, at a graphical user interface associated with the communication device, an indication of the call being answered, missed, or terminated;
  responsive to determining that the call has been answered, missed, or terminated by the communication device, automatically:
    determining an activity that a user was engaged in at the communication device at a time when the call occurred;
    determining one or more contextual identifiers associated with the call, wherein the one or more contextual identifiers are based on the activity that the user was engaged in at the time when the call occurred, and
    storing the one or more contextual identifiers in association with the indication of the call in a data structure that includes other contextual identifiers associated with other indications of calls, wherein the one or more contextual identifiers and the other contextual identifiers included in the data structure are searchable; and
  determining that the one or more contextual identifiers satisfy a search query based at least in part on a second input received at the graphical user interface, the one or more contextual identifiers and the indication of the call are determined in response to the search query.

* * * * *